United States Patent [19]
Rodriguez

[11] Patent Number: 5,811,938
[45] Date of Patent: Sep. 22, 1998

[54] EMERGENCY LIGHTING BALLAST FOR STARTING AND OPERATING TWO COMPACT FLUORESCENT LAMPS WITH INTEGRAL STARTER

[75] Inventor: Reginald J. Rodriguez, Germantown, Tenn.

[73] Assignee: The Bodine Company, Inc., Collierville, Tenn.

[21] Appl. No.: 457,477

[22] Filed: Jun. 1, 1995

[51] Int. Cl.$^6$ .................................................. H05B 37/00
[52] U.S. Cl. .......................... 315/86; 315/171; 315/207; 315/209 R; 315/360; 315/DIG. 7
[58] Field of Search ................................. 315/86, 87, 171, 315/172, 175, 177, 225, 226, 207, 209 R, 276, 277, 360, DIG. 5, DIG. 7; 363/133, 134

[56] References Cited

U.S. PATENT DOCUMENTS

| | | | |
|---|---|---|---|
| 4,550,272 | 10/1985 | Kimura et al. | 315/86 |
| 4,562,382 | 12/1985 | Elliott | 315/219 |
| 4,682,078 | 7/1987 | Pascalide | 315/86 |
| 4,686,424 | 8/1987 | Nuckolls et al. | 315/86 |
| 4,706,181 | 11/1987 | Mercer | 363/133 |
| 4,712,153 | 12/1987 | Marget et al. | 361/91 |
| 4,727,291 | 2/1988 | Bavaro | 315/86 |
| 4,751,398 | 6/1988 | Ertz, III | 315/86 X |
| 4,799,039 | 1/1989 | Balcom et al. | 340/333 |
| 4,837,779 | 6/1989 | Lundgren | 375/10 |
| 4,945,280 | 7/1990 | Beghelli | 315/129 |
| 4,977,351 | 12/1990 | Bavaro et al. | 315/87 |
| 5,004,953 | 4/1991 | McDonald | 315/86 |
| 5,154,504 | 10/1992 | Helal et al. | 315/86 X |
| 5,202,608 | 4/1993 | Johnson | 315/86 |
| 5,309,350 | 5/1994 | Kijima | 363/133 |
| 5,489,825 | 2/1996 | Rimmer | 315/277 |

*Primary Examiner*—Robert J. Pascal
*Assistant Examiner*—Haissa Philogene
*Attorney, Agent, or Firm*—Pravel, Hewitt & Kimball

[57] ABSTRACT

A method and circuit for operating two fluorescent lamps having a starter with power supplied by a battery by generating an alternating current from energy supplied by the battery, supplying the alternating current as a starting current to the lamps for a selected period of time, and at the end of the selected period of time, generating a direct current from the alternating current and supplying the direct current to the lamps in place of the alternating current.

9 Claims, 3 Drawing Sheets

EMERGENCY LIGHTING BALLAST FOR STARTING AND OPERATING TWO COMPACT FLUORESCENT LAMPS WITH INTEGRAL STARTER

BACKGROUND OF THE INVENTION

The present invention relates to power supplies for fluorescent lamps, and particularly for emergency operation of fluorescent lamps under battery power in the event of failure of a primary power supply.

While the provision of a battery back-up system for an incandescent lamp is a relatively simple matter, emergency operation of a fluorescent lamp and particularly two lamps under battery power poses certain difficulties, including those associated with the special starting requirements of a fluorescent lamp.

It is known that a fluorescent lamp can be operated under battery power by supplying the lamp with a high frequency current derived from the battery by an inverter and supplied to the lamp via a ballast capacitor or a ballast inductor. A switching device is required to switch the circuit from a start mode to an operating mode. In the operating mode, the lamp continues to be supplied with alternating current and because of the operating characteristics of a fluorescent lamp, and in particularly its negative resistance characteristic, the power supplied to the lamp during the operating mode cannot be reduced significantly, so that a fluorescent lamp, and particularly two fluorescent lamps, could be operated for only a short period of time under battery power.

An alternative approach to battery powered operation is to convert the inverter output into a rectified current which is applied to the lamp. This would permit the lamp, after starting, to be operated at a reduced power level. However, its difficult to start a fluorescent lamp with rectified current, particularly if the fluorescent lamp has an integral preheat starter. It is even more difficult to start and operate two such lamps simultaneously.

SUMMARY OF THE INVENTION

It is a primary objective of the present invention to enable two fluorescent lamps having integral preheat starters to be operated for a prolonged period under battery power.

A further object of the invention is to combine easy starting and a long term operation under battery power of two fluorescent lamps having integral preheat starters Another object of the invention is to provide the capability of operating two lamps at a reduced power level, after the two lamps have started, during operation under battery power.

The above and other objects are achieved, according to the present invention, by a method and circuit for operating two lamps having integral starter with power supplied by the battery by:
 a) generating an alternating current from energy supplied by the battery;
 b) supplying the alternating current as a starting current to two lamps for a selected period of time; and
 c) at the end of the period, generating a direct current from the alternating current and supplying the direct current to the two lamps in place of the alternating current.

According to the invention, emergency operation is carried out by supplying a high amplitude, high frequency starting current to activate the two starters and after a selected period, automatically switching to a direct current which permits operation of two lamps at a low power level. The low power level is selected to prevent the occurrence of voltage peaks which would re-ignite the lamp starters. To achieve this, the voltage supplying the direct current need only be filtered sufficiently to assure that its peak value is only slightly above its average value.

Lamps of the type employed in the practice of the present invention are provided with an integral starter circuit containing a gas discharge glow lamp which, during starting, generates heat to close a bimetallic switch to energize the filaments of the fluorescent lamp. If, subsequent to starting, the power applied to such a lamp should be reduced below a given value, in a manner which would result in a significant increase in peak voltage, the starter circuit could be reactivated, which would have the effect of turning the lamp off.

Although the invention is particularly applicable to emergency lighting systems, it can also be employed for supplying operating power to fluorescent lamps in a device in which a battery is the only power source, such as a portable lantern.

BRIEF DESCRIPTION OF THE DRAWING

FIG. 2, further, contains an alternate embodiment of the full wave bridge rectifier.

DESCRIPTION OF THE PREFERRED EMBODIMENTS

Figure 1:
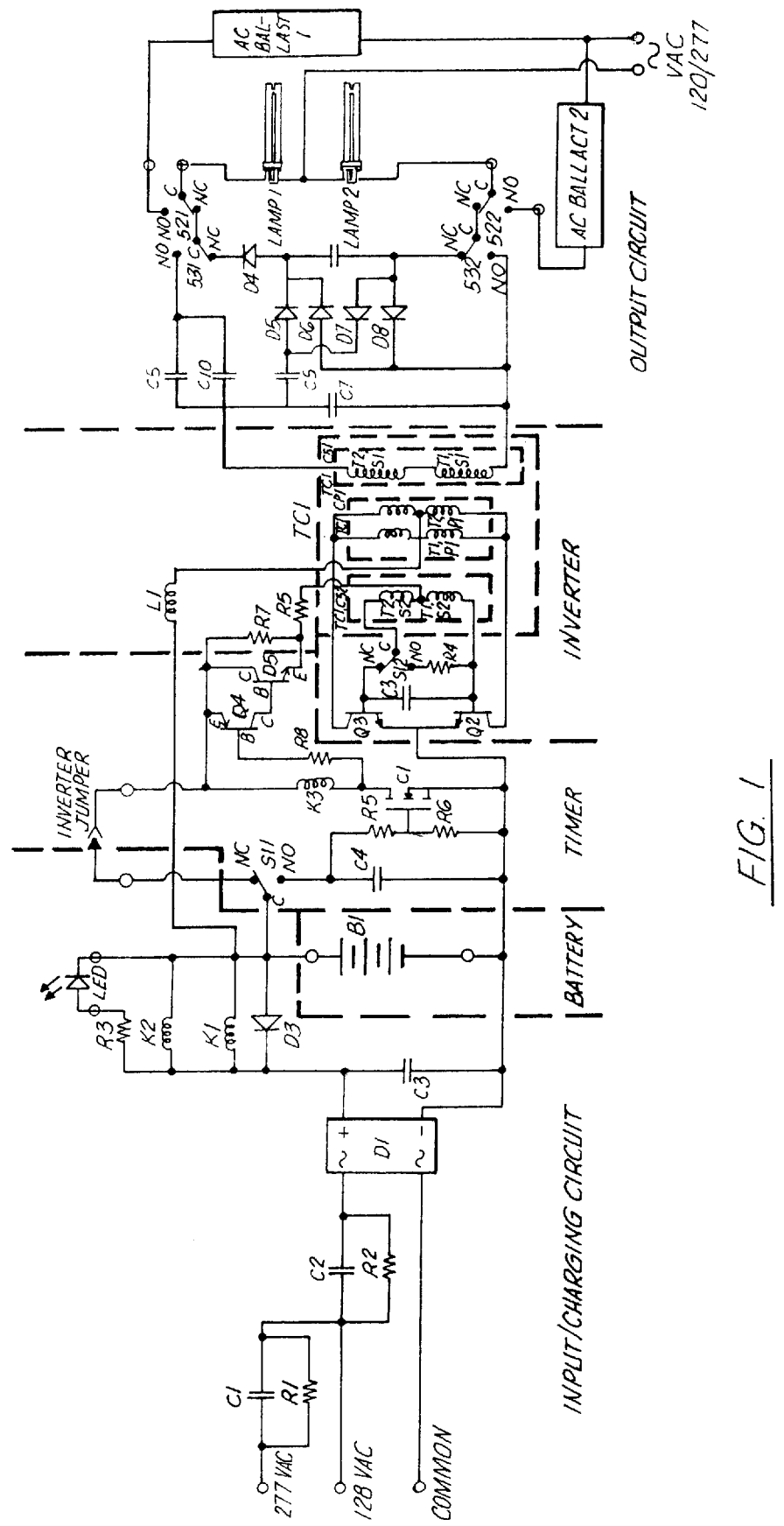
FIG. 1 is a circuit diagram of a preferred embodiment of a system according to the invention for emergency operation of two fluorescent lamps. The circuit shown in FIG. 1 further contains a preferred embodiment of a composite transformer according to the invention.

The system shown in FIG. 1 constitutes an emergency ballast for operating one or two fluorescent lamps, and particularly fluorescent lamps having an integral starter circuit, from a battery in the event of failure of the main AC supply.

The system includes an input/charging circuit which provides charging current to a battery B1 and disables the emergency operation mode as long as normal AC power is being supplied. The input/charging circuit has a first input terminal connectable to a source of high voltage, such as 277 VAC, and a second input terminal connectable to a source of a lower voltage, such as 120 VAC. Thus, the system can be selectively connected to either a high voltage or a lower voltage source. A third input terminal is arranged to be connected to a ground referenced common conductor.

The first and second input terminals are connected to a first AC input of a full wave bridge rectifier D1, the first input terminal being connected via a series arrangement of a first parallel RC circuit composed of a capacitor C1 and a resistor R1 and a second parallel RC circuit composed of a capacitor C2 and a resistor R2, and the second input terminal being connected only via the second RC circuit. The RC circuits serve to limit the charging current flowing through rectifier D1. The third input terminal is connected to a second AC input of full wave bridge rectifier D1.

Rectifier D1 produces a DC output which is supplied to battery B1 via the coils of two relays K1 and K2, a capacitor C3 which filters the current supplied to the relay coils to prevent relay chattering, and a resistor R3 connected in series with an LED charging status indicator. Capacitor C3 is connected between the output terminals of rectifier D1 and the coil of relay K1 is connected in parallel with the coil of relay K2 and with the series arrangement of resistor R3 and the LED charging status indicator. A diode D3 is connected in parallel with the coils of relays K1 and K2. The anode of diode D3 is connected to the common connection of coils of K1 and K2 and the positive terminal of battery B1. The cathode of diode D3 is connected to the common connection of coils of K1 and K2 and the positive output of rectifier D1.

Diode D3 enhances the turn off of relays K1 and K2 by allowing current to flow as a result of the back EMF generated by the collapse of the magnetic field of the coils of K1 and K2, allowing the field to decay at a higher rate.

Relay K1 further includes first and second switches S11 and S12 forming part of relay K1, each of which connects a common terminal (C) to a normally open contact (NO) of relay K1 when its coil is energized and to the normally closed (NC) of relay K1 when its coil is de-energized, the latter position being that illustrated in FIG. 1. Relays K2 and K3 have similar switches, S21 and S22 for relay K2 and S31 and S32 for relay K3, and associated sets of contacts. The connection of all of these switches will be described below.

Battery B1 may be composed, for example, of four high temperature 1.2 Volt "D" nickel-cadmium cells connected in series. Alternate battery configurations are possible. The configuration described provides a nominal output of 4.8 Volts at 4.0 Ampere-hours (Ah). If these batteries are employed to drive an inverter circuit which has a current consumption of 2.2 A, such a battery pack would provide more than 90 minutes of emergency operation. The charging current for the battery B1 is preferably set at approximately $\frac{1}{15}$ of the rated Ah capacity of the battery, so that the battery would be fully recharged within 24 hours.

The input/charging circuit described thus far is connected to a timer which serves to place the inverter and an output circuit in a high power mode for a selected period, which may be on the order of 5 to 10 seconds, after a power failure to permit starting of the fluorescent lamps.

The connection between the input/charging circuit and the timer may be effected via an inverter jumper, as shown in FIG. 1. In the event of power failure, relays K1 and K2 are de-energized, so that battery B1 will be connected to the timer via the first switch S11 associated with relay K1.

The basic components of the timer include switch S11 of relay K1, a capacitor C4, resistors R5 and R6, and a MOS-FET Q1. Capacitor C4 is in parallel with the series combination of resistors R5 and R6 and these are connected together across the battery B1 whenever relay K1 is energized. The gate of transistor Q1 is connected to the junction between resistor R4 and R5 and the drain of the transistor is connected to the positive terminal of battery B1 via the series combination of the coil of third relay K3, the inverter jumper and switch S11 of relay K1. The source of transistor Q1 is connected to the negative terminal of battery B1. The timer further includes a high current transistor switch/driver consisting of bipolar transistors Q4 and Q5 connected together in cascade. Bipolar transistor Q4 is a PNP transistor having its base connected, via a series current limiting resistor R8, to a junction between the coil of relay K3 and the drain of transistor Q1. The emitter of transistor Q4 is connected to the positive terminal of battery B1 via the series combination of the inverter jumper and first switch S11 of relay K1, and the collector of transistor Q4 is connected directly to the base of bipolar transistor Q5, which is an NPN transistor. The collector of transistor Q5 is connected to the positive terminal of battery B1 via the series combination of the inverter jumper and first switch S11 of relay K1, and the emitter of transistor Q5 is connected to a junction between resistors R7 and R9 of the inverter.

The inverter constitutes a self-resonant, switch mode power supply, specifically a push-pull current-fed inverter, and includes two identical transformers T1 and T2, each constructed to have an inductance setting gap in its core. Each transformer, T1 and T2, is composed of a tapped primary winding P1, a high voltage secondary winding Si composed of a large number of turns of fine magnet wire, and a low voltage secondary winding S2. Each winding S1 acts to step up the voltage on its associated primary winding P1 and each winding S2 acts to step down the voltage on its associated primary winding P1.

The two transformers, T1 and T2, are connected to form a composite transformer TC1 consisting of a composite primary winding CP1 formed by connecting the tapped primary windings P1 of transformers T1 and T2 in parallel with one another, a composite high voltage secondary winding CS1 formed by connecting the high voltage windings S1 of transformers T1 and T2 in series with one another, and a composite low voltage secondary winding CS2 formed by connecting the low voltage windings S2 of transformers T1 and T2 in series with one another.

The common connection between the winding S2 of transformer T1 and S2 of transformer T2 is considered the center tap of the composite transformer winding CS2. Two NPN bipolar transistors Q2 and Q3 are connected so that the collector-emitter path of each is connected between the respective end of primary winding CP1 and the negative terminal of battery B1, as shown in FIG. 1.

During emergency operation of the system, the low voltage secondary winding CS2 of composite transformer TC1 is connected between the bases of transistors Q2 and Q3 via the second switch S12 of relay K1 to provide positive feedback from primary winding CP1 of composite transformer TC1. Capacitor C9 is connected between the bases of transistors Q2 and Q3 to provide suppression of high frequency switching transients.

The inverter is connected to battery B1 via an inductor L1 which is connected in series between battery B1 and a center tap of primary CP1 to filter the supply current and provide instantaneous current limiting in the event that both transistors Q2 and Q3 are simultaneously rendered conductive during switching. During emergency operation, a series combination of resistors R9 and R7 is connected between the center tap of winding CS2 and the positive terminal of battery B1 via series path containing the inverter jumper and switch S11 of relay K1. The emitters of transistors Q2 and Q3 are connected to the negative terminal of the battery B1.

In the charging mode of operation, resistor R4 is connected by relay switch S12 in parallel with the low voltage winding CS2. Resistor R4 is connected to winding CS2 to provide a positive turn-off characteristic for the inverter when the AC supply is present. When the normal AC power is being supplied, battery B1 is being charged and the inverter circuit should not normally operate because the base drive to the inverter has been disconnected via switch S11 of relay K1. However, because the battery B1 remains connected to the inverter via the inductor L1 and because of the presence of the positive feedback winding CS2, the inverter could occasionally oscillate. The purpose of the arrangement of switch S12 of relay K1 and resistor R4 is to provide a means to disconnect positive feedback winding CS2 from the base of transistor Q3 and connect it to the energy dissipating resistor R4 to insure that the inverter does not oscillate.

The output circuit provides current limiting, and thus power regulation, for the lamps, and controls switching between normal lamp operation from the primary power supply and emergency operation, as well as switching, during emergency operation, between the high power starting mode and the low power operating mode.

The output circuit is composed of a capacitor C7 connected across the secondary winding CS1 of the composite transformer TC1. A first current limiting capacitor composed of a parallel arrangement of two capacitors C6 and C10 is connected between one side of the secondary winding CS1 and the normally open contact of the first switch S31 of relay K3. While a single high voltage capacitor could be employed, two lower rated capacitors are preferred because of their smaller overall physical size and lower cost. This first current limiting capacitor C6, C10, is connected to the lamps during emergency starting operation and acts as a ballast to limit the AC current to the lamps during starting.

The output circuit further includes an arrangement for supplying a filtered DC voltage to the lamps in the emergency operating mode. This arrangement includes a capacitor C5 connected to one side of secondary winding CS1 to serve as a ballast capacitor which limits the lamp current. Four diodes D5, D6, D7, and D8 forming a full wave rectifier are connected between the side of capacitor C5 which is remote from secondary winding CS1 and the other side of secondary winding CS1. The common connection of the cathode end of diodes D5 and D6 is the positive output of the rectifier, whereas the common connection of the anode end of diodes D7 and D8 is the negative output of the rectifier. A capacitor C8 is connected across the output of the rectifier and serves to filter the DC voltage presented to the lamps via a series diode D4 connected from the positive output of the rectifier to the normally closed contact of switch S31 of relay K3.

Diode D4 serves to present a high impedance path to one half-cycle of the arc current flowing in switches S21 and S22 of relay K2 and switches S31 and S32 of relay K3 when both relays K2 and K3 are de-energized. The presence of diode D4: 1) diverts more of the arc current component produced by energy in series parasitic inductances toward the lamps; 2) significantly reduces the driving current of the transformer by increasing the total impedance seen by the secondary winding CS1; and 3) reduces the energy dissipated in the contacts of switches S31 and S32 of relay K3 and in the contacts of switches S21 and S22 of relay K2. Without the diode D4, the filter capacitor C8 would provide a very low impedance path, causing the arc current to have a larger amplitude and a longer duration. During normal operation, when the main AC power supply is functioning, charging current is supplied from rectifier D1 and filter capacitor C3 to battery B1. This charging current energizes relays K1 and K2 so that the timer, the inverter and the output circuit are inactive, and relay K3 is de-energized so that the common contacts of first and second switches S31 and S32 are connected to their associated normally closed contacts. The common contact of first switch S11 of energized relay K1 is connected to its normally open contact so that the battery B1 is connected to charge the timer capacitor C4 from battery B1 and that common contact is at the same time disconnected from the base drive portion of the timer circuit.

The common contact of the second switch S12 of relay K1 is, in this operating state, connected to its normally open contact so that the secondary winding CS2 of transformer TC1 is connected to the energy absorbing resistor R4 and is disconnected from the base terminal of transistor Q3 so as to insure that the inverter will not operate. In addition, the common contacts of the first and second switches S21 and S22 of the energized relay K2 are connected to their respective normally closed contacts so that the lamps are disconnected from the inverter output circuit and are each connected in series or in parallel to a respective AC ballast, depending on the type of AC ballast used.

If the main power supply should fail, relays K1 and K2 are de-energized so that the lamps are disconnected from the AC ballast(s) and connected to the output circuit via the first and second switches S21 and S22 of relay K2, and battery B1 is connected to the timer and inverter via switches S11 and S12 of relay K1.

Upon initial application of battery voltage to the timer, an energizing current flows through the coil of relay K3 via transistor Q1 which has been previously rendered conductive by the energy stored in the capacitor C4 prior to the failure of the main power supply. The common contacts of switches S31 and S32 of the energized relay K3 are connected to their respective first and second normally open contacts so that the lamps are connected to the high power portion of the output circuit. In addition, when transistor Q1 is conductive, current flows through the current limiting resistor R8 and the emitter-base path of transistor Q4 and transistor Q4 is driven into saturation; this in turn supplies sufficient current in the base-emitter path of transistor Q5 so that transistor Q5 is driven into saturation, resulting in a current flow through resistor R9 of the inverter. Resistor R9 is given a sufficiently low resistance to supply a base current which will drive transistors Q2 and Q3 in the high power emergency starting mode.

From the moment that the main power supply fails, the initial charge on capacitor C4 begins to discharge through resistors R5 and R6, decreasing the voltage at the gate of transistor Q1. When the voltage reaches a value such that transistor Q1 can no longer remain n saturation, the current through the coil of relay K3 begins to decrease and eventually reaches the point at which the relay K3 is deactivated. At this point, switches S31 and S32 of relay K3 are operated to place the output circuit in the emergency operating mode, in which the lamps are supplied with filtered direct current at a reduced power level.

Transistors Q4 and Q5 are given sufficient gain to produce a base current which will cause transistor Q5 to remain in saturation until the current through transistor Q1 has dropped to the point at which relay K3 is de-energized. This insures that sufficient drive current will be provided to the inverter until the output circuit has completely switched to the low power DC operating mode.

During the starting mode, the voltage across battery B1 drops slightly and is modulated by the high current flowing through the timer, the inverter, the internal battery resistance, and other circuit impedances. As the charge on capacitor C4 approaches the point at which switching will occur from the starting mode to the operating mode, the current through transistor Q1, the coil of relay K3 and the emitter-base path of transistor Q4 will assume a pulsating DC form due to the modulated signal on the power supply rail, i.e. the node identified by the common connection of the emitter of Q4, the collector of Q5, R7, and the coil of relay K3. At this point, transistor Q5 would normally have a tendency to come out of saturation, except that, in this circuit arrangement, the emitter-collector path of transistor Q4 serves as a current source capable of providing sufficient current to the base-emitter path of transistor Q5 to keep transistor Q5 saturated, so that the inverter is supplied a sufficient current via the collector-emitter path of transistor Q5 and the current limiting resistor R9. During this time, the base current in transistor Q4 is being supplied via the path of the conducting transistor Q1.

Although relay K3 is de-energized due to insufficient current through its coil, the remaining charge on capacitor C4 continues to discharge, keeping transistor Q1 in its conducting state for a period of time after relay K3 has been de-energized. The decreasing voltage on the gate of Q1 reduces the conduction of Q1 and allows the voltage on the drain of Q1 to slowly rise toward the battery voltage, thus slowly reducing the current in the base-emitter path of transistor Q4 to zero, which forces the current in the base-emitter path of transistor Q5 to zero, rendering transistor Q5 non-conducting. After capacitor C4 has been fully discharged and all three transistors Q1, Q4, and Q5 have switched off, there is no further current flow through the timer. The remaining low level current supplied to the drive side of the inverter is from the battery B1 via the series path that includes resistors R7 and R9.

Embodiments of this invention could employ a capacitor connected between the common connection of the collector Q4 and base Q5 and the negative terminal of the battery B1. The addition of this capacitor increases the time for which a higher current is supplied to the inverter after the relay K3 is de-energized.

When AC power is restored to the system, even if only momentarily, capacitor C4 will immediately charge and the timer will be able to reinitiate another emergency start cycle, thus insuring continued provision for emergency lighting as long as battery B1 remains sufficiently charged. Resistor R5 serves to limit surge current into the gate terminal of transistor Q1 and thus to protect the transistor Q1 from damage.

During operation in the emergency mode, energizing current is supplied from battery B1 to primary winding CP1 of transformer TC1 via inductor L1, causing the inverter to oscillate. Positive feedback is provided at secondary winding CS2 and bias current for operating transistors Q2 and Q3 is supplied via resistor R9 when the circuit is in the emergency start mode and via resistors R7 and R9 when the system is in the emergency DC operating mode. The primary winding CP1 of transformer TC1 is fed by the inductor L1, which serves as a current source and causes the output voltage waveform to be sinusoidal. A high frequency, high voltage output is generated across secondary winding CS1.

The composite transformer TC1 has several attributes that contribute significantly to the overall reliability, efficiency, and performance of this invention. The high voltage output across the winding CS1 is distributed over two series connected high voltage secondary windings T1,S1 and T2,S1 resulting in less voltage (or dielectric) stress on each of the high voltage secondary windings; thus, minimizing the probability of failure. The use of two cores, one for T1 and another for T2, results in more efficient core utilization by reducing the necessary magnetic flux density in the cores; thus, reducing the losses and increasing the overall efficiency of the transformer. The composite primary CP1 is composed of two windings T1,P1 and T2,P1 in parallel resulting in a smaller primary current in the individual windings, allowing for some reduction in wire size and still allowing for an increased efficiency due to reduced copper losses. Because of the additional core and the increased space, allowing for a greater number of secondary turns, the inductance of the high voltage secondary winding CS1 is made large while still maintaining a significant air gap; thus allowing less opportunity for the transformer to saturate at the high current levels encountered in the start mode.

Because of the additional bias current applied via transistor Q5 during the starting mode, the inverter is able to produce a higher output power in the emergency starting mode than in the emergency operating mode. The frequency of the output supplied by the inverter is primarily determined by the inductance of the secondary winding CS1 of transformer TC1 and the secondary load capacitance. The value of this inductance is a function of the total number of turns constituting the winding CS1, the type and shape of the core material, and the air gap of the core. The largest component of the secondary load capacitance consists of the parallel combination of capacitors C7, C6, and C10 in the starting mode and of the parallel combination of capacitors C7 and C5 in the emergency operating mode.

The reduction in bias current in the operating mode reduces the battery bias current drain on the order of 90%, thereby prolonging emergency operation of the lamps. Moreover, reduction in the bias currents results in reduced heat dissipation in the inverter so that components having a lower wattage rating, and thus a lower cost, can be used in the inverter.

An exemplary embodiment of the circuit according to the invention was employed to operate two Osram Dulux D# 26 Watt double twin tube (quad) compact fluorescent lamps, with the inverter operating at a nominal frequency of 5.2 kHz and capacitors C6 and C10 each having a value of 10,000 pF. During the initial phase of an emergency start operation, the starting arc voltage across the series connection of the two lamp starters was 625 VRMS at a low current level.

Figure 3:
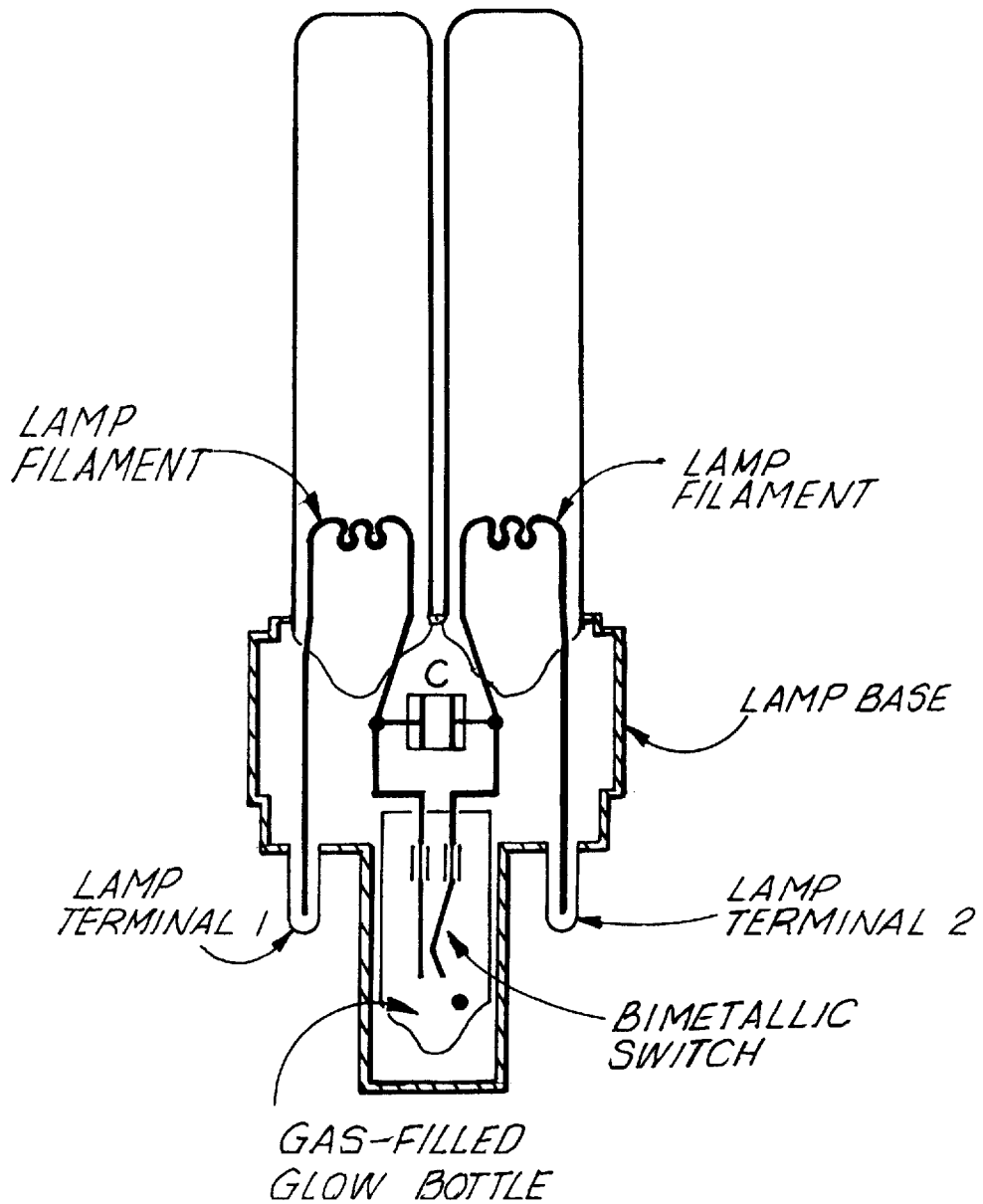
FIG. 3 is a diagram showing a double twin tube lamp with an integral starting circuit of a type which advantageously may be operated by a circuit according to the invention.

As illustrated in FIG. 3, each of the lamp filaments is heated and the bimetal switch in the starter closes briefly and then opens and the lamp is turned on. During the remainder of the starting mode, the voltage across the series connection of the two lamps has a value of the order of 122 VRMS and the lamps draw a current of approximately 269 mA, resulting in a total power consumption of about 30.2 W or approximately 15.1 W per lamp.

Upon switching to the DC operating mode, the components for supplying the DC voltage are selected so that the voltage across the series connection of the two lamps has a value of 337 V and the lamps draw a common current of 27 mA, the two lamps thus operating with a total power consumption of only 8.9 W. With a battery input power of 11.7 W, the ballast operates with an efficiency of approximately 76%.

Because of the small AC ripple component of the filtered DC voltage, the peak amplitude of the filtered DC voltage is only slightly higher than its average value and a relatively high voltage can be provided without any danger of re-igniting either of the lamp's integral starting circuit.

In the output circuit, capacitor C7 provides a load across secondary winding CS1 even if no lamps are connected to the circuit. In the emergency starting mode, high frequency alternating current is supplied to the lamps via capacitors C6 and C10. At the end of the starting mode, the contacts of switches S31 and S32 of relay K3 are switched so that a filtered DC current is produced by diodes D5, D6, D7, and D8 and supplied to the lamps via capacitor C8 and diode D4.

Figure 2:
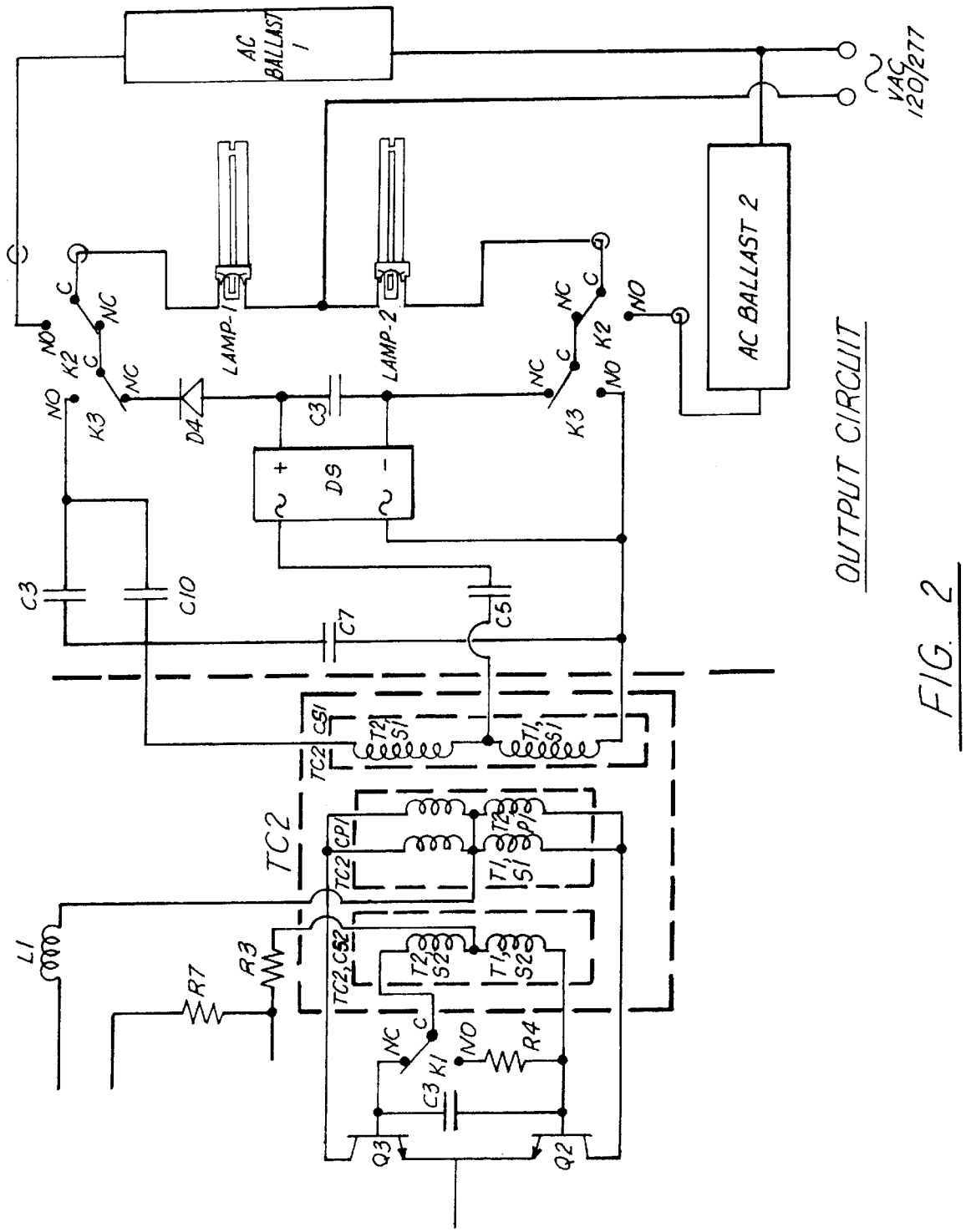
FIG. 2 is a partial circuit diagram of an alternate embodiment of the composite transformer.

Either embodiment of the invention could employ an integrated full wave rectifier D9, illustrated in FIG. 2, in place of the discrete full wave bridge rectifier formed by diodes D5, D6, D7, and D8, illustrated in FIG. 1. In addition either embodiment could employ a half-wave rectifier if adequate filtering is provided at its output. Further, the filter capacitor C8 could be replaced with a standard L-section filter or a standard Pi-section filter.

Embodiments of the invention could also employ an alternate composite transformer TC2 connected as shown in FIG. 2. This composite transformer is similarly composed by interconnecting two individual transformer, T1 and T2. While transformers T1 and T2 of composite transformer TC1 are electrically identical, in composite transformer TC2 the number of turns of the windings of transformer T1 is different from that of the windings of transformer T2. However, each transformer of each composite transformer is composed of a tapped primary winding P1, a high voltage secondary winding S1 composed of a large number of turns of fine magnet wire, and a low voltage secondary winding S2. Like composite transformer TC1, the two transformers, T1 and T2, are connected to form composite transformer TC2 consisting of a composite primary winding CP1 formed by connecting the tapped primary windings P1 of T1 and T2 in parallel, a composite high voltage secondary winding CS1 formed by connecting the high voltage secondary windings S1 of T1 and T2 in series, and a composite low voltage secondary winding CS2 formed by connecting the low voltage secondary windings S2 of T1 and T2 in series. The composite windings CP1 and CS2 of the composite transformer TC2 are connected to the remainder of the circuit in identically the same manner as the corresponding composite windings of composite transformer TC1 in FIG. 1. The winding CS1 of the composite transformer TC2 is connected differently such that the common connection between winding S1 of T1 and winding S1 of T2 is considered the tap of the composite transformer winding CS1 and is connected to the emergency operating portion of the output circuit via the capacitor C5. The remaining connections of the composite winding CS1 are connected to the remainder of the output circuit in identically the same manner as was the corresponding composite winding of TC1 in FIG. 1.

As noted above, transformers T1 and T2 of composite transformer TC1 are electrically identical to one another, e.g. all windings of transformer T1 have the same number of turns as the corresponding windings of transformer T2. In contrast, in composite transformer TC2, the number of winding turns, WT, for windings P1 and P2 differ between transformers T1 and T2 as follows:

In addition to the attributes noted above for the use of composite transformer TC1, the composite transformer TC2 demonstrated the ability to cause the circuit to regulate the battery current and to provide more power to the lamps. An exemplary embodiment of the circuit using composite transformer TC2 connected as shown in FIG. 2 and according to the invention was employed to operate two of the lamps shown in the following table:

| MFG. and LAMP TYPE | BATTERY | | TWO LAMPS | | ENERGY |
|---|---|---|---|---|---|
| | Current | Power | Current | Power | Efficiency |
| Philips PLC 26W | 2.22 A | 11.3 W | 24.5 mA | 7.0 W | 62% |
| Osram Dulux D 26W | 2.33 A | 12.6 W | 30 mA | 9.0 W | 71% |
| Sylvania F26DTT | 2.17 A | 11.2 W | 26 mA | 8.8 W | 78% |

| MFG. and LAMP TYPE | BATTERY | | TWO LAMPS | | ENERGY |
|---|---|---|---|---|---|
| | Current | Power | Current | Power | Efficiency |
| Philips PLC 13W | 2.37 A | 12.0 W | 35 mA | 8.2 W | 68% |
| Osram 13DTT USA | 2.13 A | 10.3 W | 46 mA | 7.8 W | 76% |
| GE F13DBXT4 | 2.35 A | 11.8 W | 33 mA | 7.9 W | 67% |

Conditions of the test measurements were: (1) Battery voltage varied from 4.8 V to 5.4 V. (2) The measurements where taken at approximately two minutes into the emergency operating mode. (3) In each case, two lamps were used. (4) The lamp current was the current in each lamp and the lamp power was the total power to both lamps.

It was noted that the battery current remains relatively constant for the various lamps loads. When compared to the embodiment of this invention using TC1, this embodiment using TC2 had higher battery currents and higher lamp power for the operation of the two 13 Watt lamps. The operation of two 26 Watt lamps were comparable for the two embodiments.

Physically, each composite transformer TC1 and TC2 is constituted by two E-core transformers, possibly mounted side-by-side. The core of an E-core transformer is made up of two core halves, each having the shape of an "E", with the free end of the horizontal legs of one core half facing those of the other core half. The center leg of each E-core transformer has an air gap, as is conventional, and carries a bobbin on which all of the windings of that transformer are wound. Thus, one E-core transformer includes the windings of transformer T1 and the other E-core transformer includes the windings of transformer T2. In prototypes of the present invention, transformers T1 and T2 were built on E 187 type cores.

Parts List of Preferred Implementation
Part Description
R1 Resistor carbonfilm 5% ½ watt 10 megaohm
R2 Resistor carbonfilm 5% ½ watt 10 megaohm
R3 Resistor carbonfilm 5% ½ watt 180 ohm
R4 Resistor carbonfilm 5% ½ watt 5.1 ohm
R5 Resistor carbonfilm 5% ½ watt 10 kilohm
R6 Resistor carbonfilm 5% ½ watt 6.8 megaohm
R7 Resistor carbonfilm 5% 2.0 watt 56 ohm
R8 Resistor carbonfilm 5% ½ watt 47 ohm
R9 Resistor metalfilm 5% 2.0 watt 3 ohm
C1 Capacitor film polyester 5% 250 VAC 6.0 microfarad
C2 Capacitor film polyester 5% 250 VAC 4.0 microfarad
C3 Capacitor aluminum electrolytic 20% 25 VDC 220 microfarad
C4 Capacitor film metallized polyester 10% 63 VDC 0.68 microfarad
C5 Capacitor disc ceramic 20% 3000 VDC 820 picofarad
C6 Capacitor disc ceramic 20% 2000 VDC 10000 picofarad
C7 Capacitor disc ceramic 20% 3000 VDC 820 picofarad
C8 Capacitor disc ceramic 10% 2000 VDC 6800 picofarad
C9 Capacitor film metallized polyester 10% 63 VDC 0.68 microfarad
C10 Capacitor disc ceramic 20% 2000 VDC 10000 picofarad
Q1 Transistor MOSFET P-channel VN22221
Q2 Transistor bipolar NPN D44H8
Q3 Transistor bipolar NPN D44H8
Q4 Transistor bipolar PNP 2N4403

Q5 Transistor bipolar NPN MPS651
B1 Battery pack Ni—Cd 4.0 amperehour 4.8 volts
T1 Transformer
  Primary: 26 turns, 25 AWG magnet wire center tapped
    Low voltage secondary: 5 turns 28 AWG magnet wire
    High voltage secondary: 700 turns 35 AWG magnet wire Core: E187 3C8 material, 0.020 inch center leg gap Bobbin—E187ZYTEL Plastron 8 pin
T2 Transformer
  Primary: 26 turns, 25 AWG magnet wire center tapped
  Low voltage secondary: 5 turns 28 AWG magnet wire
  High voltage secondary: 700 turns 35 AWG magnet wire
  Core: E187 3C8 material, 0.020 inch center leg gap
  Bobbin—E187ZYTEL Plastron 8 pin
L1 Inductor 10% 24 microhenry
K1 Relay PCB DPDT coil 5 VDC contacts 250 VAC 2 A
K2 Relay PCB DPDT coil 5 VDC contacts 250 VAC 2 A
K3 Relay PCB DPDT coil 5 VDC contacts 250 VAC 2 A In exemplary embodiments of the invention which have been built and successfully operated, the windings of each transformer of each composite transformer had the following number of turns:

Each transformer T1, T2 of TC1 (FIG. 1): each half of P1, 13 turns; S1, 700 turns; S2, 5 turns;

Each transformer T1, T2 of TC2 (FIG. 2): each half of P1, 7 turns; S1, 475 turns; S2, 3 turns.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed:

1. A system for operating two fluorescent lamps having integral starters with power supplied by a battery, comprising:
   a) inverter means for generating an alternating current from energy supplied by the battery including transformer means having two separate primary windings connected in parallel, each of said primary windings being substantially independently inductively coupled to one of two separate high voltage secondary windings connected together in series;
   b) lamp starting means connected to said inverter means for operatively connecting said series high voltage secondary windings in series with the fluorescent lamps for supplying the alternating current as a starting current to the two fluorescent lamps for a selected period of time; and
   c) rectifier means connected to said inverter means for maintaining the fluorescent lamps in operation by supplying direct current to the lamps from energy supplied by the battery through said rectifier means, said rectifier means being operatively connected to said two fluorescent lamps at the expiration of said selected period of time.

2. A system as defined in claim 1 wherein said transformer means further comprise two primary windings connected together in parallel and connected to receive electrical current from the battery, each of said primary windings being inductively coupled substantially only to a respective one of said high voltage secondary windings.

3. A system as defined in claim 1 wherein said transformer means are constituted by two physically separate transformers each having a respective one of said high voltage secondary windings, a respective one of said primary windings and a core on which the respective windings are wound.

4. A system as defined in claim 3 wherein each of said transformers is an E-core transformer.

5. A system as defined in claim 1 wherein said rectifier means includes a filter for suppressing ripple currents connected across said rectifier means output.

6. A system as defined in claim 1 wherein said inverter means comprises two bipolar transistors connected in cascade to said parallel primary windings of said transformer means.

7. A system as defined in claim 1 for emergency operation of the lamps, said system forming a part of apparatus for normally operating the lamps with power supplied by AC power mains, wherein said system comprises means for effecting positive turn-off of said inverter means for generating an alternating current when power is being supplied to the lamps by the AC power mains.

8. A system as defined in claim 1 further comprising switch means connected between the lamps and both said inverter means and said rectifier means, said switch means including a mechanical switching element switchable between a first state in which said inverter means are connected to the lamps and a second state in which said rectifier means are connected to the lamps, said switch means including a diode connected to the output of said rectifier, and said mechanical switching element being connected between said diode and the lamps.

9. A system for operating at least one fluorescent lamp with power supplied by a battery, said system forming a part of apparatus for normally operating the lamp with power supplied by AC power mains, said system comprising:
   a) means for generating an alternating current from energy supplied by the battery;
   b) lamp starting means connected to said generating means for supplying the alternating current as a starting current to the at least one lamp;
   c) lamp operating means connected to said generating means for maintaining the at least one lamp in operation by supplying direct current to the at least one lamp from energy supplied by the battery after the at least one lamp has started; and
   d) means for effecting positive turn-off of said means for generating an alternating current when power is being supplied to the at least one lamp by the AC power mains.

* * * * *